United States Patent [19]
Hicok et al.

[11] Patent Number: 5,561,761
[45] Date of Patent: Oct. 1, 1996

[54] CENTRAL PROCESSING UNIT DATA ENTERING AND INTERROGATING DEVICE AND METHOD THEREFOR

[75] Inventors: Gary D. Hicok, Mesa; Judson A. Lehman, Scottsdale, both of Ariz.; Thomas Alexander, Hillsboro, Oreg.; Yong J. Lim, Seattle, Wash.; David R. Evoy, Tempe, Ariz.; Yongmin Kim, Seattle, Wash.

[73] Assignee: YLSI Technology, Inc., San Jose, Calif.

[21] Appl. No.: 522,856

[22] Filed: Sep. 1, 1995

Related U.S. Application Data

[63] Continuation of Ser. No. 40,862, Mar. 31, 1993, abandoned.

[51] Int. Cl.$^6$ .................................................. G06F 11/00
[52] U.S. Cl. .............................. 395/183.06; 395/183.16; 395/183.1
[58] Field of Search ................. 395/183.06, 183.07, 395/183.08, 183.1, 184.01, 183.16

[56] References Cited

U.S. PATENT DOCUMENTS

| | | | |
|---|---|---|---|
| 4,899,306 | 2/1990 | Greer | 371/16.1 |
| 4,926,363 | 5/1990 | Nix | 371/20.1 |
| 4,982,402 | 1/1991 | Beaven et al. | 371/16.1 |
| 5,021,997 | 6/1991 | Archie et al. | 371/16.1 |
| 5,033,047 | 7/1991 | Uehara | 371/16.1 |
| 5,157,781 | 10/1992 | Harwood et al. | 395/575 |
| 5,163,052 | 11/1992 | Evans et al. | 371/16.1 |
| 5,226,149 | 7/1993 | Yoshida et al. | 395/575 |
| 5,228,139 | 7/1993 | Miwa et al. | 395/575 |
| 5,274,797 | 12/1993 | Barlow et al. | 395/575 |
| 5,276,857 | 1/1994 | Hartung et al. | 395/575 |

OTHER PUBLICATIONS

Immaneni et al "Direct Access Test Scheme–Design of Block and Core Cells for Embedded ASICS" 1990 Int. Test Conference IEEE pp. 488–492.

Immaneni et al. "Direct Access Test Scheme–Implementation and Verification in Embedded ASIC Designs" 1990 IEEE ASIC Semirar+Exhibit.

*Primary Examiner*—Robert W. Beausoliel, Jr.
*Assistant Examiner*—Joseph E. Palys
*Attorney, Agent, or Firm*—Harry M. Weiss & Associates

[57] ABSTRACT

A Central Processing Unit (CPU) debugging device and method therefor is disclosed which provides data entering and interrogating devices which will temporarily stop all CPU execution when desired by a user and allow a nondestructive intrusion into the contents of any of the CPU internal registers, state bits, and cache and local memories. After the desired CPU contents have been reviewed and subsequently altered or maintained by a user, the CPU execution may be resumed.

16 Claims, 2 Drawing Sheets

CENTRAL PROCESSING UNIT DATA ENTERING AND INTERROGATING DEVICE AND METHOD THEREFOR

This is a continuation of application Ser. No. 08/040,862 filed on Mar. 31, 1993, now abandoned.

FIELD OF THE INVENTION

This invention relates generally to Central Processing Unit (CPU) devices and, more specifically, to debugging devices for a CPU and method therefor which provides a data entering and interrogating device which temporarily stops all CPU executions upon user command and allows a non-destructive intrusion into the contents of all of the CPU internal registers, state bits, and cache and local memories.

DESCRIPTION OF THE PRIOR ART

Superscalar pipelined RISC processors are extremely difficult to debug. Experience using the ARM RISC created the desire to create a method for finding out the state of the CPU at any time and subsequently being able to debug the CPU. In an attempt to meet this demand in the past, software type debugging methods such as breakpoint, trap, and interrupt methods were attempted. However, these methods tended to be extremely clumsy; furthermore, they introduced extra variables into the debugging process, thereby further complicating this non-trivial task.

As an example of a software type debugging process, a user may set up software interrupts to stop program execution on a regular basis. During an interrupt period, a user may review the progress of the program by examining various registers. Unfortunately, there are several registers in addition to cache and RAM that are transparent to software debugging methods. To review cache using software type debugging methods, a user can flush the cache contents and then re-read the cache, but this approach is inconvenient, in addition, this method alters the state of the cache logic and control.

A slight improvement over software debugging methods was provided by the Joint Task Action Group (JTAG) or SCAN method. In the JTAG method, some CPU registers could be accessed; however, JTAG required an increase in the number of gates and in the external logic required to offer this capability. Due to the larger number of gates and external logic required by the JTAG method, the already limited "real estate" available for use in system design was further reduced. At best, the JTAG method offers a partial solution to the debugging challenge because it has a limited visibility only to registers. In other words, the JTAG method failed to provide visibility into the cache, CPU state, and local (connected to the CPU) memory. Another disadvantage offered by the JTAG method is the serial fashion in which the data is retrieved.

Therefore, a need existed to provide a device that allows "non-destructive" review of all internal registers, state bits, cache memory, and local memory. It is desirable that such a device be able to stop a CPU, review the desired registers, state bits, and/or memory, and then resume CPU operation. Such a device would be even more advantageous, if it were implemented using minimum logic gates and if such a device were capable of being used in a multiple CPU environment.

SUMMARY OF THE INVENTION

In accordance with one embodiment of this invention, it is an object of this invention to provide a combined central processing unit (CPU) and data entering and interrogating device for use in debugging a CPU and method therefor.

It is another object of this invention to provide a combined central processing unit (CPU) and data entering and interrogating device for use in debugging a CPU that can access all elements of a CPU in a parallel manner that is non-destructive to the data within the elements.

It is a further object of this invention to provide a combined central processing unit (CPU) and data entering and interrogating device for use in debugging a CPU that can temporarily stop a CPU, load data into various CPU elements, and resume CPU operation.

It is still another object of this invention to provide a combined plurality of central processing units (CPUs) and data entering and interrogating devices for use in debugging each of the plurality of CPUs.

BRIEF DESCRIPTION OF THE PREFERRED EMBODIMENTS

In accordance with one embodiment of this invention, a combined central processing unit (CPU) and data entering and interrogating device is disclosed comprising, in combination, a CPU having a plurality of elements comprising at least an arithmetic logic unit (ALU), a register file, a plurality of data buffers, an execution and addressing unit, an instruction and data cache, and a memory controller, in addition to a data entering and interrogating device coupled to the CPU comprising, selection means having connections to all of the plurality of elements within the CPU for selectively choosing each of the elements for interrogation of all data contained within each of the elements, data control means connected to the selection means for controlling data flow into and out of each of the elements for selectively supplying data into and receiving data out of each of the elements, and pausing means connected both to the selection means and to the data control means for temporarily stopping operation of the CPU to selectively permit interrogation of each of the elements and data flow into and out of each of the elements.

In accordance with another embodiment of this invention, a method of operating a combined central processing unit (CPU) and data entering and interrogating device is disclosed comprising the steps of providing a CPU having a plurality of elements comprising at least an arithmetic logic unit (ALU), a register file, a plurality of data buffers, an execution and addressing unit, an instruction and data cache, and a memory controller, providing a data entering and interrogating device coupled to the CPU comprising the steps of providing selection means having connections to all of the plurality of elements within the CPU for selectively choosing each of the elements for interrogation of all data contained within each of the elements, providing data control means connected to the selection means for controlling data flow into and out of each of the elements for selectively supplying data into and receiving data out of each of the elements, and providing pausing means connected both to the selection means and to the data control means for temporarily stopping operation of the CPU to selectively permit interrogation of each of the elements and data flow into and out of each of the elements.

The forgoing and other objects, features, and advantages of the invention will be apparent from the following, more particular, description of the preferred embodiments of the invention, as illustrated in the accompanying drawings.

DESCRIPTION OF THE PREFERRED EMBODIMENT

Figure 1:
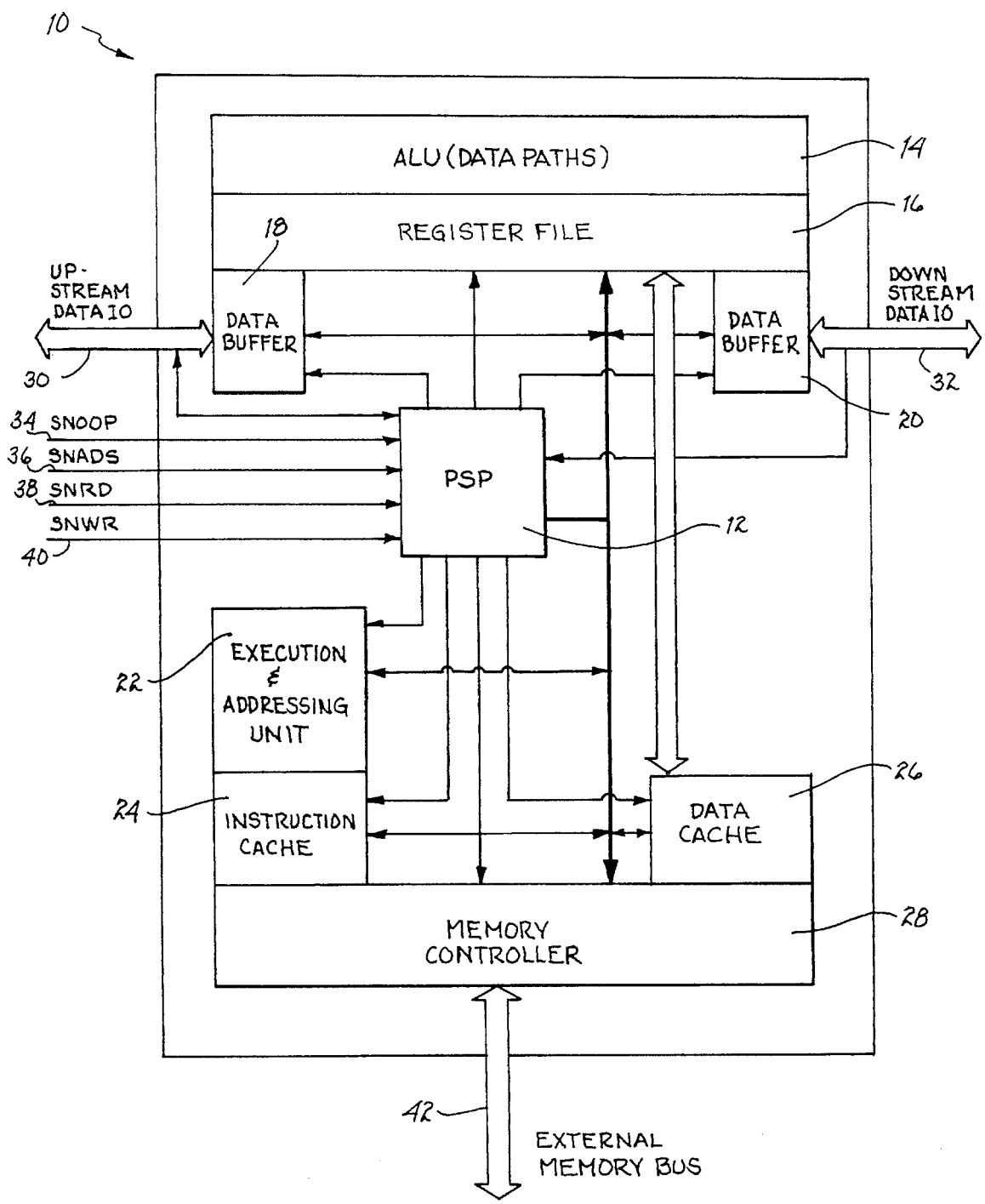
FIG. 1 shows a simplified block diagram of the combined CPU and data endring and interrogating device.

Referring to FIG. 1, a combined central processing unit (CPU) and data entering and interrogating device is generally designated by reference number 10. Within the combined central processing unit (CPU) and data entering and interrogating device 10 is the data entering and interrogating device 12. Note that the data entering and interrogating device 12 is also identified in FIG. 1 by "PSP" which is an abbreviation for programmer's snoop port. Also located within the combined central processing unit (CPU) and data entering and interrogating device 10 are ALU (data paths) 14, register file 16, data buffers 18 and 20, execution and addressing unit 22, instruction cache 24, data cache 26, and memory controller 28. The data entering and interrogating device 12 has connections and therefore data access to all elements within not only the combined central processing unit (CPU) and data entering and interrogating device 10 as shown in FIG. 1, but also any other possible CPU.

Again referring to FIG. 1, there is an upstream data I/O bus 30 connected both to the data buffer 18 and the data entering and interrogating device 12. Similarly, a downstream data I/O bus 32 is connected both to the data buffer 20 and the data entering and PATENT interrogating device 12. The control signals SNOOP 34, SNADS 36, SNRD 38, and SNWR 40 are input to the data entering and interrogating device 12. An external memory bus 42 is also shown connected to the memory controller 28 to provide data path to external memories such as DRAM or SRAM (not shown).

Figure 2:
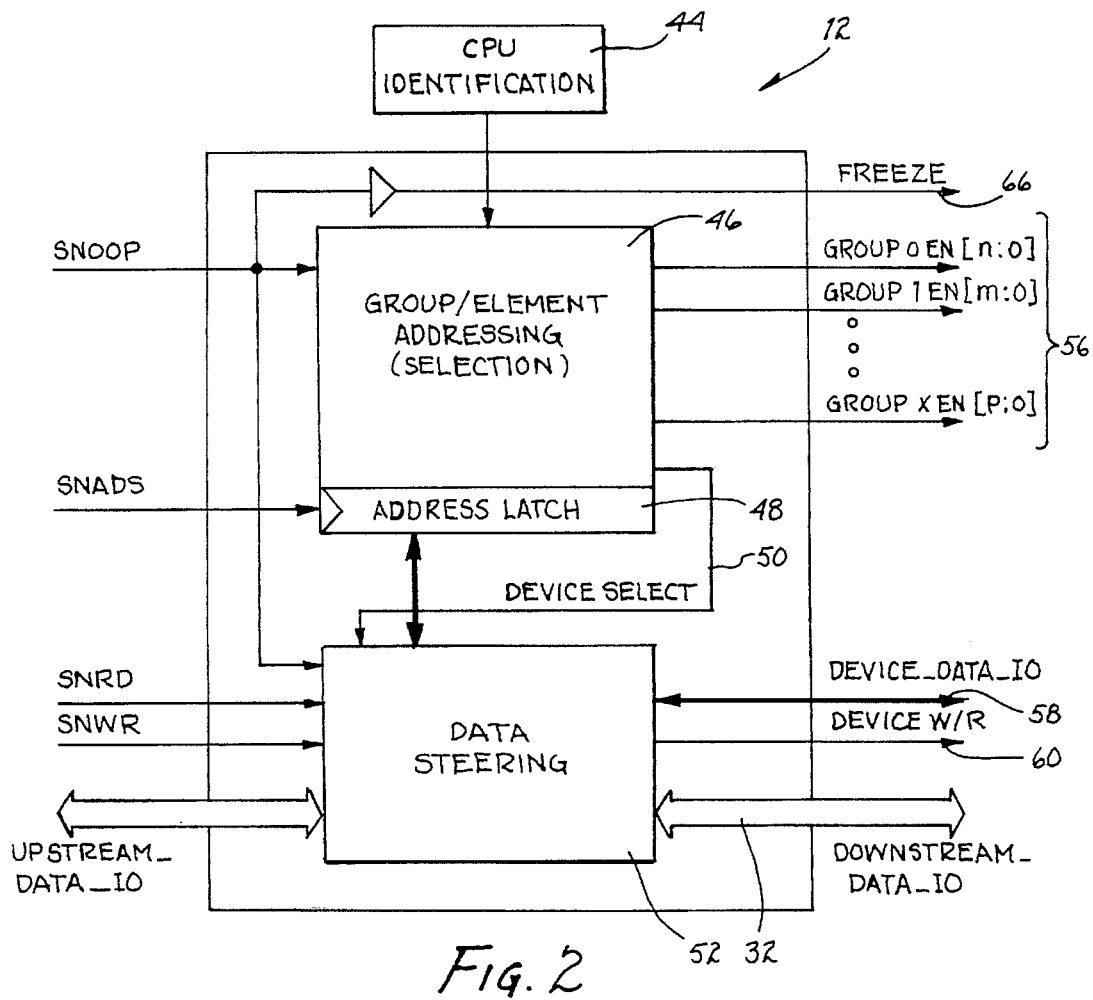
FIG. 2 shows a more detailed block diagram of the data entering and interrogating device which is part of the combined CPU and data entering and interrogating device shown in FIG. 1.

Referring to FIG. 2, the data entering and interrogating device 12 is shown isolated from the combined central processing unit (CPU) and data entering and interrogating device 10 from FIG. 1. The CPU identification or CPU identification means 44 is connected to the group/element addressing selection or selection means 46 to provide device identification data to the data entering and interrogating device 12. The group/element addressing selection portion 46, hereafter referred to as the selection portion 46, has a plurality of group/element select lines 56 for choosing each element of the combined central processing unit (CPU) and data entering and interrogating device 10 for interrogation. An address latch or address latch means 48 is shown as part of the selection portion 46. A SNADS signal 36 is input into the address latch 48 in order to strobe in an address into the address latch 48. The selection portion 46 has a device select line 50 connected to the data steering portion 52. Also connected to the data steering portion or data control means 52 are both the upstream data I/O bus 30 and the downstream data I/O bus 32. The SNRD 38 and SNWR 40 signals represent the signal identification means which are input to the data steering portion 52. The device data I/O bus 58 or connection means is connected both to the data steering portion 52 and to each element of the combined central processing unit (CPU) and data entering and interrogating device 10 for the purpose of interrogation. The device W/R (Write/Read) bus 60 or signal means is also connected both to the data steering portion 52 and to each element of the combined central processing unit (CPU) and data entering and interrogating device 10 for the purpose of identifying a write or read type of interrogation. The SNOOP signal 34 is input to both the selection portion 46 and to the data steering portion 52 to initiate a "snoop cycle". In addition, the SNOOP signal 34 is input to a buffer 54 to drive a FREEZE signal 66 which halts the operation of the combined central processing unit (CPU) and data entering and interrogating device 10 in a manner which is non-destructive to the data of this device for the purpose of interrogation of this data.

Figure 3:
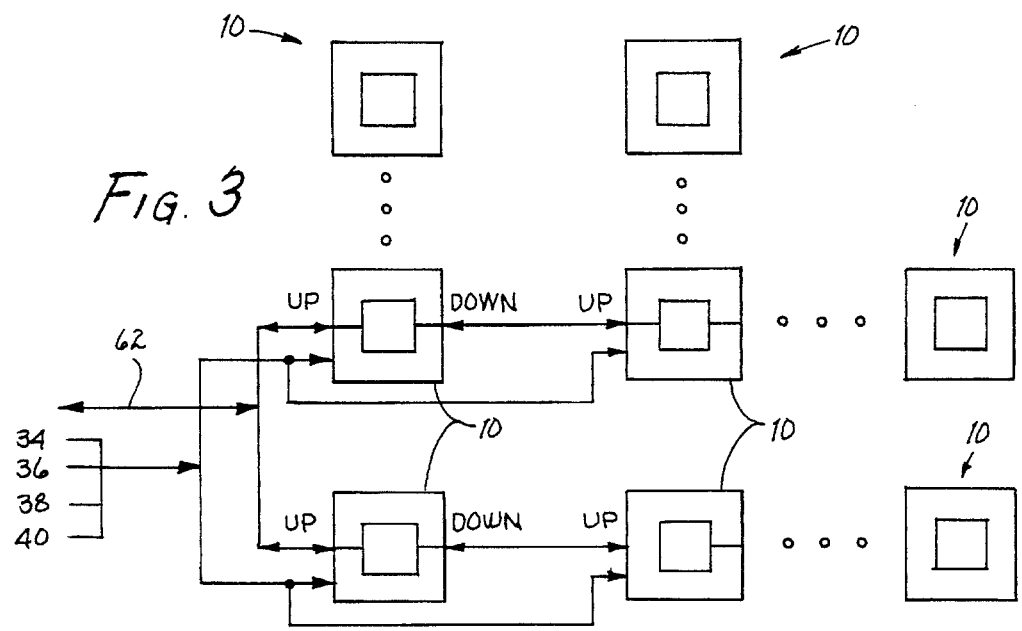
FIG. 3 shows a general block diagram of one possible embodiment using a plurality of CPUs each having their own data entering and interrogating device.

In reference to FIGS. 1 and 2, the embodiment showing a single combined central processing unit (CPU) and data entering and interrogating device 10 is defined. FIG. 3 shows another embodiment using a plurality of combined central processing unit (CPU) and data entering and interrogating devices 10. In particular, FIG. 3 shows that a plurality of these devices can be interconnected in a serial, parallel, or combined serial/parallel fashion. In general, any number of the devices 10 can be interconnected by repetitively attaching the downstream data I/O bus 32 of one device 10 to the upstream data I/O data bus 30 of another device 10. In addition, each of the plurality of devices 10 are connected to control signals inputs SNOOP 34, SNADS 36, SNRD 38, and SNWR 40. Ultimately, the device 10 chosen for interrogation from the plurality of devices 10 passes its data through the interconnected devices 10 and through connection 62 to a user output device (not shown).

OPERATION

Referring to FIGS. 2 and 3, the operation of a plurality of the combined central processing unit (CPU) and data entering and interrogating devices 10 is discussed by showing how one of the plurality of devices 10 works. The CPU identification 44 transfers data to the selection portion 46. This data consists of a device specific combination of 4 bits which distinguishes one particular combined central processing unit (CPU) and data entering and interrogating device 10 from any other. It should also be mentioned that different methods of identification may be used such as changing the number of identification bits. When a user is ready to interrogate a particular combined central processing unit (CPU) and data entering and interrogating device 10, he enters commands from an input device (not shown). These commands activates the SNOOP signal 34 to signify that a "snoop cycle" is about to take place. The SNOOP signal 34 is input to both the selection portion 46 and the data steering portion 52 to communicate that a "snoop cycle" is about to occur. In addition, n 55612816.001 the SNOOP signal 34 passes through a buffer 54 to create the FREEZE signal 66 which stops the operation of the CPU without altering CPU data. During this "snoop cycle", the upstream data I/O bus 30 and the downstream data I/O bus 32 are "taken over" from its normal functions during "non-snoop cycle" operations. A 16 bit word is sent through the upstream data I/O bus 30 and the data steering portion 52. This 16 bit word is then strobed into the address latch 48 by SNADS signal 36. The four highest order bits of this 16 bit word identifies which one of the plurality of devices 10 is being interrogated. The CPU identification is compared with these four highest order bits to determine whether this particular device 10 is being interrogated or not. If this particular device 10 is being interrogated, then the device select line 50 informs the data steering portion to "steer" data from its own device data I/O bus 58 to the upstream data I/O bus 30, and subsequently to the user. If however a different device 10 is being interrogated, then the device select line 50 informs the data steering portion to "steer" data from its downstream data I/O bus 32 to the upstream data I/O bus 30, thereby transferring data from this different device 10 to the user.

In addition to the 4 highest order bits from the 16 bit word in the address latch 48 are 12 bits which determine which group/element of the device 10 is to be interrogated. Consequently, the selection portion 46 selects the proper group/element via activation of the appropriate group/element line 56. A user may either read data from or write data to a particular element. The SNRD 38 and the SNWR signals distinguish between these operations. The activation of the SNRD signal 38 informs the data entering and interrogating device 10 that the "snoop cycle" is a read type cycle while the activation of the SNWR signal 40 tells the data entering and interrogating device 10 that the "snoop cycle" is a write type cycle. Based upon which one of the SNRD 38 and the SNWR 40 signals are active, the data steering portion 52 sends a read or write signal to the element to be interrogated via device W/R bus 60. The actual data flow to and/or from a particular element flows through the device data I/O bus 58 and to the user via the upstream data I/O bus 30.

While the invention has been particularly shown and described with reference to the preferred embodiments thereof, it will be understood by those skilled in the art that the foregoing and other changes in form and details may be made therein without departing from the spirit and scope of the invention. For example, it would be obvious to those skilled in the art to add elements within a CPU and therefore increase the number of address bits from 16 in order to be able to interrogate these new elements. It would be obvious to those skilled in the art to combine a plurality of these combined central processing unit (CPU) and data entering and interrogating devices 10 in a serial manner, a parallel manner, or any other combination.

I claim:

1. A combined central processing unit (CPU) and data entering and interrogating device comprising, in combination:

a CPU having a plurality of elements comprising at least an arithmetic logic unit (ALU), a register file, a plurality of data buffers, an execution and addressing unit, and instruction and data cache, and a memory controller;

a data entering and interrogating device integrally coupled to and located within said CPU comprising:

selection means having connections to all of said plurality of elements within said CPU for selectively choosing each of said elements for interrogation of all data contained within each of said elements;

data control means connected to said selection means for controlling data flow into and out of each of said elements for selectively supplying data into and receiving data out of each of said elements; and pausing means connected both to said selection means and to said data control means for temporarily stopping operation of said CPU to selectively permit interrogation of each of said elements and data flow into and out of each of said elements without destroying any of said data contained within each of said elements and for allowing said CPU to resume operation once said interrogation of said elements is completed;

said data entering and interrogating device being substantially independently dedicated to said CPU.

2. The device of claim 1 including CPU identification means connected to said selection means for enabling said data entering and interrogating device.

3. The device of claim 2 wherein said selection means having address latch means for selecting each of said elements for interrogation.

4. The device of claim 1 wherein said data control means is provided with signal identification means for distinguishing between a read type and a write type of signal applied to said data entering and interrogating device.

5. The device of claim 4 wherein said data control means is provided with signal means for sending a read type or a write type signal from said data entering and interrogating device to each of said elements of said CPU.

6. The device of claim 5 wherein said data control means is provided with connection means for transferring data to and from each of said elements of said CPU.

7. The device of claim 6 wherein said data control means is provided with at least a first and a second data input/output bus.

8. The device of claim 1 wherein a plurality of CPUs each having said data entering and interrogating device located therein and means coupled to each of said plurality of CPUs for entering and retrieving data to and from each of said plurality of CPUs.

9. A method of operating a combined central processing unit (CPU) and data entering and interrogating device comprising the steps of:

providing a CPU having a plurality of elements comprising at least an arithmetic logic unit (ALU), a register file, a plurality of data buffers, an execution and addressing unit, and instruction and data cache, and a memory controller;

providing a data entering and interrogating device integrally coupled to and located within said CPU comprising the steps of:

providing selection means having connections to all of said plurality of elements within said CPU for selectively choosing each of said elements for interrogation of all data contained within each of said elements;

providing data control means connected to said selection means for controlling data flow into and out of each of said elements for selectively supplying data into and receiving data out of each of said elements; and providing pausing means connected both to said selection means and to said data control means for temporarily stopping operation of said CPU to selectively permit interrogation of each of said elements and data flow into and out of each of said elements without destroying any of said data contained within each of said elements and for allowing said CPU to resume operation once said interrogation of said elements is completed;

said data entering and interrogating device being substantially independently dedicated to said CPU.

10. The method of claim 9 including the step of providing CPU identification means connected to said selection means for enabling said data entering and interrogating device.

11. The method of claim 10 wherein said selection means having address latch means for selecting each of said elements for interrogation.

12. The method of claim 9 wherein said data control means is provided with signal identification means for distinguishing between a read type and a write type of signal applied to said data entering and interrogating device.

13. The method of claim 12 wherein said data control means is provided with signal means for sending a read type or a write type signal from said data entering and interrogating device to each of said elements of said CPU.

14. The method of claim 13 wherein said data control means is provided with connection means for transferring data to and from each of said elements of said CPU.

15. The method of claim 14 wherein said data control means is provided with at least a first and a second data input/output bus.

16. The method of claim 9 wherein a plurality of CPUs is provided each having said data entering and interrogating device located therein and means coupled to each of said plurality of CPUs for entering and retrieving data to and from each of said plurality of CPUs.

* * * * *